(12) United States Patent
Charron et al.

(10) Patent No.: US 11,761,866 B2
(45) Date of Patent: Sep. 19, 2023

(54) APPARATUS FOR INTRODUCING TEST LOADS TO A ROTOR BLADE

(71) Applicant: Bell Textron Inc., Fort Worth, TX (US)

(72) Inventors: Louis Charron, Saint-Jérôme (CA); Maxime Lapalme, St-Lin-Laurentides (CA); Daniel Del Rossi, LaSalle (CA); Alexis Dugré, Boisbriand (CA)

(73) Assignee: Textron Innovations Inc., Providence, RI (US)

( * ) Notice: Subject to any disclaimer, the term of this patent is extended or adjusted under 35 U.S.C. 154(b) by 16 days.

(21) Appl. No.: 17/678,808

(22) Filed: Feb. 23, 2022

(65) Prior Publication Data
US 2023/0266216 A1   Aug. 24, 2023

(51) Int. Cl.
*G01N 3/20* (2006.01)
*G01M 5/00* (2006.01)

(52) U.S. Cl.
CPC ........... *G01N 3/20* (2013.01); *G01M 5/0016* (2013.01); *G01N 2203/0073* (2013.01)

(58) Field of Classification Search
CPC ........... G01N 3/20; G01N 2203/0073; G01M 5/0016
See application file for complete search history.

(56) References Cited

U.S. PATENT DOCUMENTS

| 2010/0263448 | A1 | 10/2010 | Hughes et al. |
| 2017/0350785 | A1 | 12/2017 | Greaves |
| 2021/0025786 | A1 * | 1/2021 | Kim .......................... G01N 3/08 |
| 2022/0026310 | A1 | 1/2022 | Shiomi et al. |

FOREIGN PATENT DOCUMENTS

| CN | 111811965 A | * 10/2020 | ............ G01M 13/00 |
| CN | 112504873 A | * 3/2021 | ................ B64F 5/60 |
| GB | 2367631 A | 4/2002 | |
| GB | 2472193 A | 2/2011 | |
| KR | 101048618 B1 | 7/2011 | |
| WO | WO-2016102968 A1 | 6/2016 | |

OTHER PUBLICATIONS

Rasuo, Bosko; "Experimental Techniques for Evaluation of Fatigue Characteristics of Laminated Constructions from Composite Materials: Full-Scale Testing of the Helicopter Rotor Blades," Journal of Testing and Evaluation, vol. 39, No. 2; Apr. 18, 2011; pp. 1-6.
Gustafson, Arthur J., et al. .; MODEL 540 Main Rotor Blade Fatigue Test; Report No. USAAMRDL-TN-22; Technical Note; Army Air Mobility Research and Development Laboratory Fort Eustis, Virginia; Jan. 1976; 39 pages.

* cited by examiner

*Primary Examiner* — Natalie Huls
*Assistant Examiner* — Cynthia L Davis
(74) *Attorney, Agent, or Firm* — Bradley Arant Boult Cummings LLP

(57) ABSTRACT

An apparatus for introducing a test load to a rotor blade test specimen for fatigue testing includes a body extending along a longitudinal axis in a first direction from a first end to a second end, and the body having an internal cavity with an opening at the second end configured to dispose a tip portion of the rotor blade test specimen.

18 Claims, 5 Drawing Sheets

APPARATUS FOR INTRODUCING TEST LOADS TO A ROTOR BLADE

TECHNICAL FIELD

This disclosure relates in general to testing of rotor blades, and more particularly, but not by way of limitation, to introducing a test load to a for fatigue testing of rotor aircraft blades.

BACKGROUND

This section provides background information to facilitate a better understanding of the various aspects of the disclosure. It should be understood that the statements in this section of this document are to be read in this light, and not as admissions of prior art.

Fatigue testing of a rotor blade involves introducing a large load that is due in operation to the centrifugal force. Physically, this load represents the mass of the blade rotating at a certain speed at a certain distance from the center. In a fatigue test, the load is introduced as a single load at the tip end of the blade for simplicity. However, blades need to be reinforced to withstand the load and progressively transfer it to the test specimen. Current techniques rely on manufacturing expansive composite doublers in custom molds, machining end plates to fit the loading machine, e.g., test jig, and stacking and bonding the complex assembly. The final assembly often requires additional machining to meet tolerances and align the test specimen in the test jig. The current technique is a long and expensive process to prepare each test specimen.

SUMMARY

An exemplary apparatus for introducing a test load to a rotor blade test specimen for fatigue testing includes a body extending along a longitudinal axis in a first direction from a first end to a second end, and the body having an internal cavity with an opening at the second end configured to dispose a tip portion of the rotor blade test specimen.

Another exemplary apparatus for introducing a test load to a rotor blade test specimen for fatigue testing includes a body extending along a longitudinal axis in a first direction from a first end to a second end, the body having an internal cavity having an opening at the second end configured to dispose a tip portion of the rotor blade test specimen, a clamp portion extending from the first end, the clamp portion have a top planar section and bottom planar section, and a load transfer portion extending from the clamp portion to the second end, where a stiffness of the load transfer portion progressively decreases in the first direction.

An exemplary method for preparing a rotor blade test specimen for fatigue testing includes producing an apparatus for introducing a test load from a test jig to the rotor blade test specimen, wherein the apparatus comprises a body extending along a longitudinal axis in a first direction from a first end to a second end, and the body having an internal cavity with an opening at the second end and positioning a tip portion of the rotor blade test specimen inside the internal cavity.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
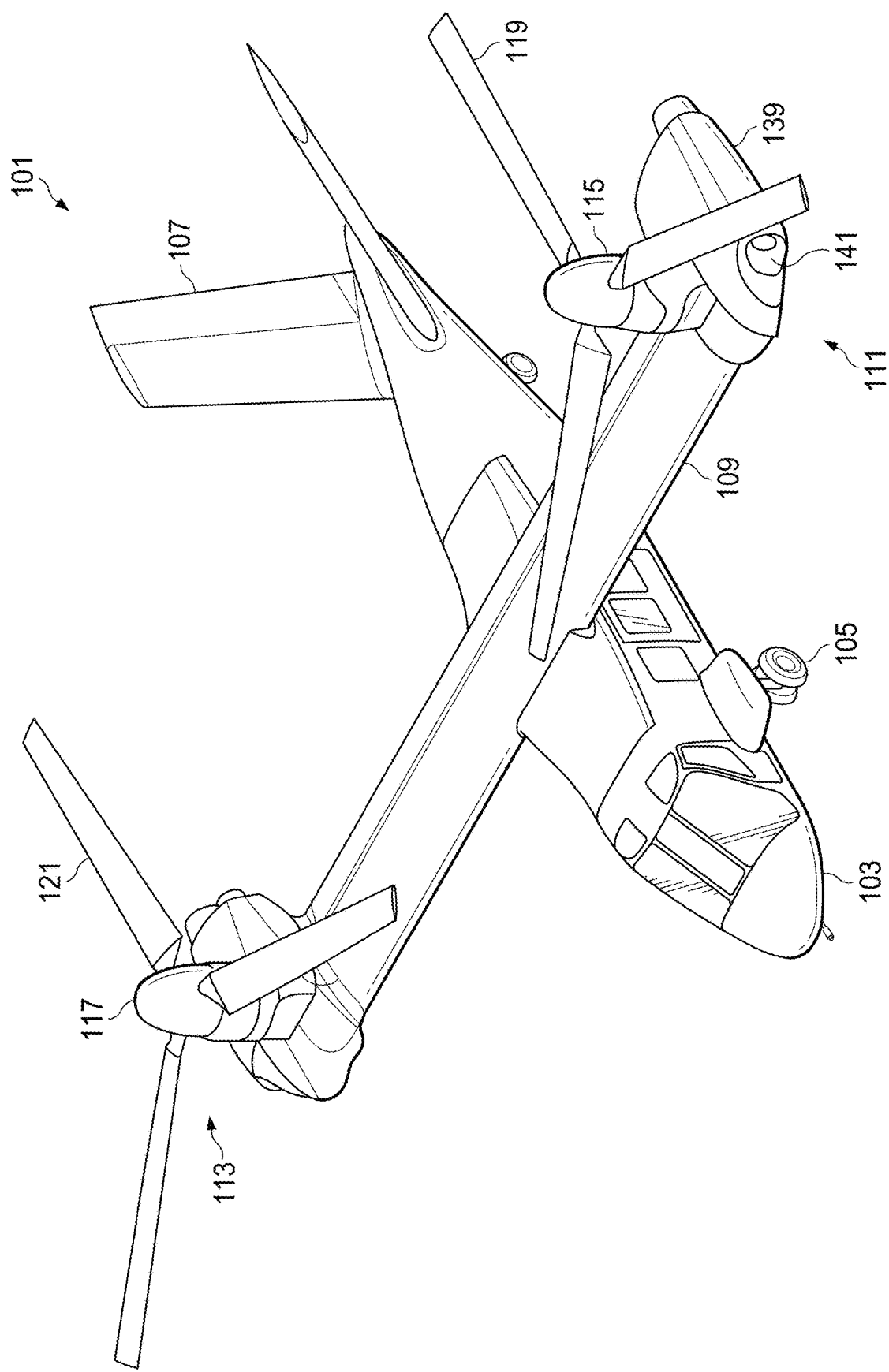
FIG. 1 is a perspective view of an exemplary rotor aircraft.
Figure 2:
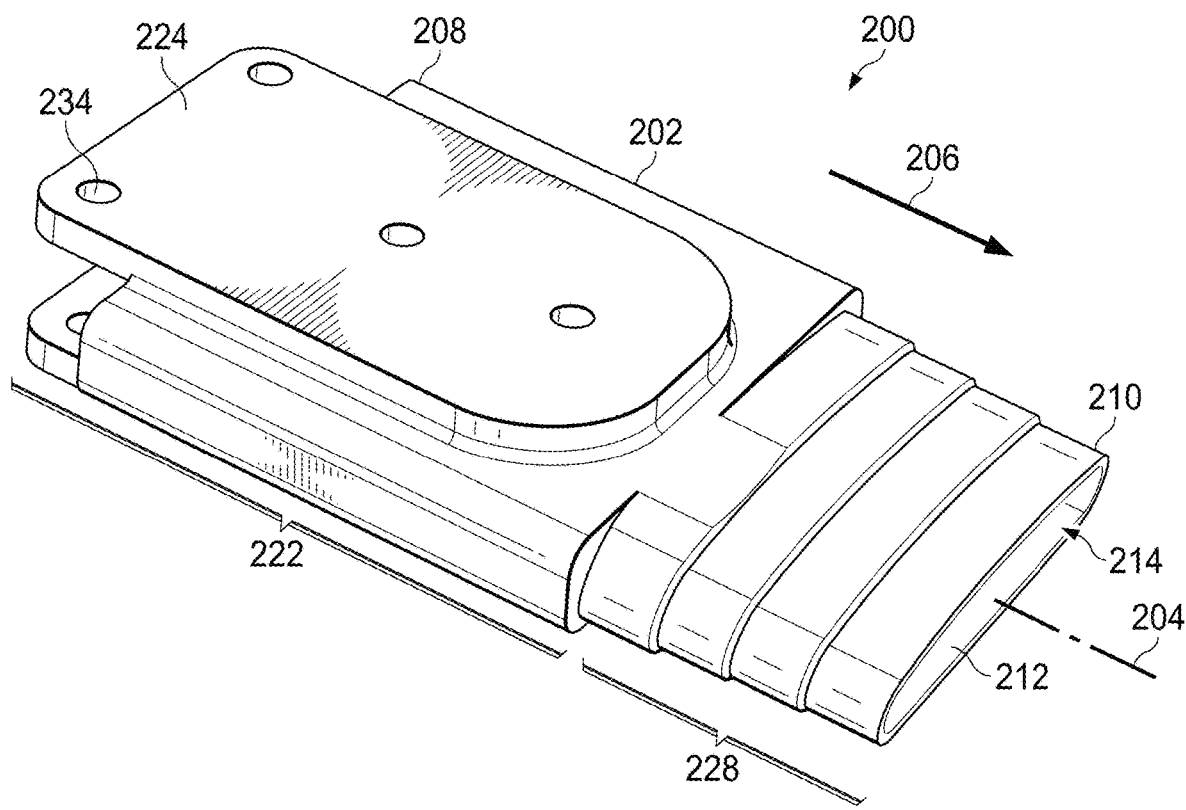
FIG. 2 is a perspective view of an exemplary apparatus for introducing a test load to a rotor blade test specimen for fatigue testing.
Figure 3:
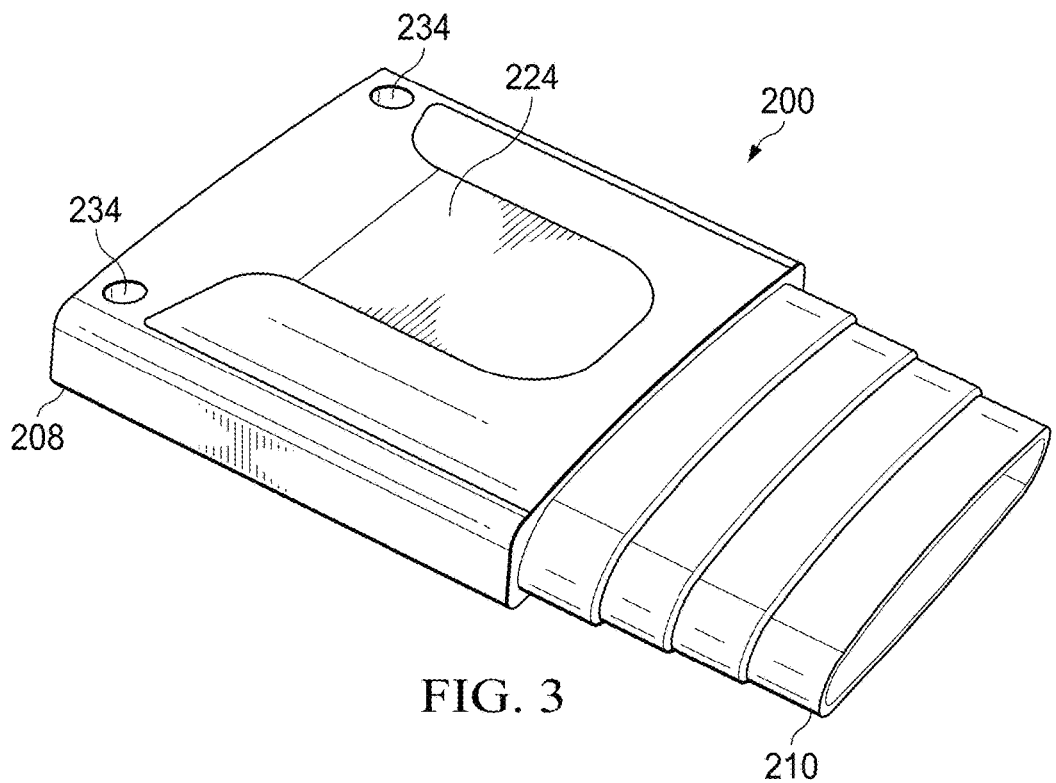
FIG. 3 is a perspective view of another exemplary apparatus for introducing a test load to a rotor blade test specimen for fatigue testing.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 illustrates an exemplary rotor aircraft 101, according to aspects of the disclosure. Rotor aircraft 101 includes a fuselage 103, landing gear 105, a tail member 107, a wing 109, a drive system 111, and a drive system 113. Each drive system 111, 113 includes a fixed engine 139 and a proprotor 115, 117, respectively. Each proprotor 115, 117 has a plurality of rotor blades 119, 121, respectively, associated therewith. The position of proprotors 115, 117, as well as the pitch of rotor blades 119, 121, can be selectively controlled in order to selectively control direction, thrust, and lift of rotor aircraft 101.

Drive system 113 is substantially symmetric to drive system 111; therefore, for sake of efficiency, certain features will be disclosed only with regard to drive system 111. However, one of ordinary skill in the art would fully appreciate an understanding of drive system 113 based upon the disclosure herein of drive system 111. Further, drive systems 111, 113 are illustrated in the context of rotor aircraft 101; however, drive systems 111, 113 can be implemented on other rotor aircraft. For example, an alternative embodiment may include a quad tiltrotor that has an additional wing member aft of wing 109; the additional wing member can have additional drive systems similar to drive systems 111, 113. In another embodiment, drive systems 111, 113 can be used with an unmanned version of rotor aircraft 101. Further, drive systems 111, 113 can be integrated into a variety of rotor aircraft configurations. Additionally, other drive systems are contemplated. For example, one example is a gearbox arrangement to provide torque to a rotor system of a helicopter. Referring to rotor aircraft in general, each drive system 111, 113 includes a mast driven by a power source (e.g., engine 139). The power source, mast, and yoke are components for transmitting torque. The power source may include a variety of components including an engine, a transmission, and differentials. In operation, each mast receives torque from the power source to rotate the yoke. Rotation of the yoke causes the rotor blades to rotate to generate thrust.

FIGS. 2-7 illustrate exemplary apparatuses 200 for introducing a test load into a rotor blade test specimen 400 for fatigue testing. Apparatus 200 includes a body 202 extending along a longitudinal axis 204 in a first direction 206 from a first end 208 to a second end 210. Body 202 has an internal cavity 212 with an opening 214 at second end 210. Internal cavity 212 is configured to dispose a tip portion 402 of rotor blade test specimen 400. Internal cavity 212 has a profile corresponding to the profile of the tip portion of the rotor blade test specimen. Body 202 has a top portion 216 and a bottom portion 218 corresponding to the top surface 404 and the bottom surface 406 of rotor blade test specimen 400. Top and bottom surfaces 404, 406 extend for example from the blade's leading edge 408 to the trailing edge 410.

Apparatus 200 is formed by additive manufacturing of body 202. In an exemplary embodiment, body 202 consists of a single piece. In another embodiment, body 202 consists of two pieces. In a two-piece configuration, body 202 may be divided between top portion 216 and bottom portion 218. The two-piece configuration may be used for example when the rotor blade shape makes it difficult to slide the body onto the rotor blade test specimen.

Body 202 is configured with a stiffness that progressively decreases in first direction 206. The stiffness may be progressively changed in various manners. In one example, the material of construction may be changed to reduce the stiffness. In an exemplary embodiment, the thickness 220 (FIG. 5), in the direction orthogonal to top and bottom portions 216, 218, can progressively decrease in first direction 206. The operational centrifugal load needs to be simulated on the blade test specimen. During operation of an aircraft, the centrifugal force creates higher loads within the blade from tip to root 412. The test jig is not capable of doing this and instead applies a constant axial load through the blade test specimen. For the purpose of the load test, the axial load needs to match the value that blade root 412 would see in operation. Therefore, the test load is too great for what the tip of the blade test specimen can handle. Therefore, apparatus 200 covers a large area of blade test specimen 400 and extends toward blade root 412. Apparatus 200 spreads the axial load and prevents damage to the tip of the blade. The stiffness of apparatus 200 is controlled, in an example, by reducing thickness 220 as it approaches second end 210. Abrupt changes in stiffness can cause damage to the blade test specimen during testing, especially since there is bending involved in the testing. Apparatus 200 facilitates control of the geometry and stiffness to ensure that the load is applied to the test specimen in the desired manner.

Apparatus 200 and body 202 may include a clamp portion 222 and a load transfer portion 228. Clamp portion 222 extends from first end 208 and has a top planar section 224 and a bottom planar section 226. Top and bottom planar sections 224, 226 may be configured for securing the apparatus and blade test specimen into a test jig 600, see e.g., FIG. 6. Test jigs differ and some have clamps that bolt to the test specimen and others have hydraulic clamps to grip the specimen. The planar sections may serve as an embedded alignment feature to orient the blade test specimen in the test jig. Load transfer portion 228 extends from clamp portion 222 to second end 210. The stiffness of load transfer portion 228 progressively decreases in the direction of second end 210.

Figure 4:
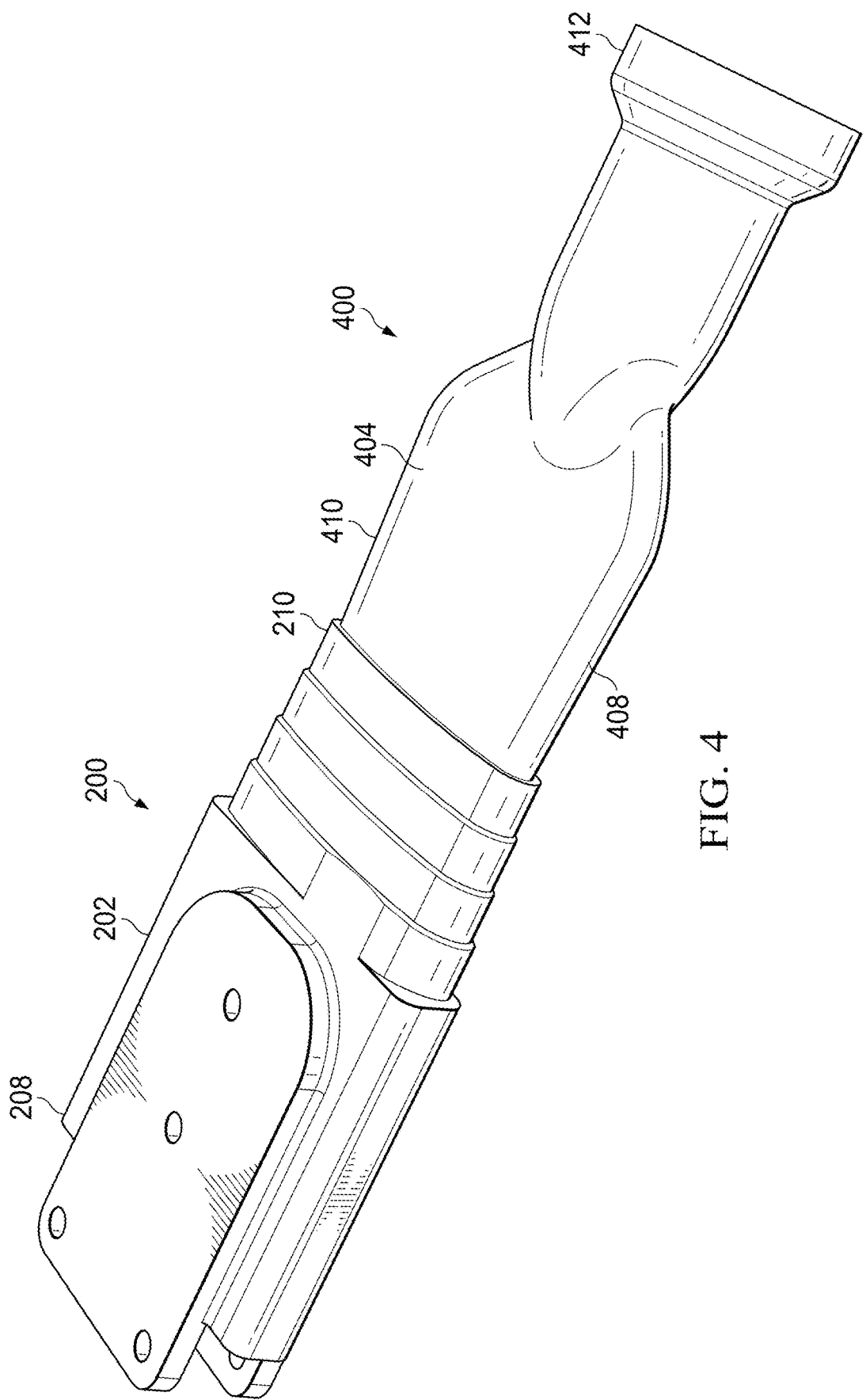
FIG. 4 is a perspective view of an exemplary load transfer apparatus attached to a rotor blade test specimen.
Figure 5:
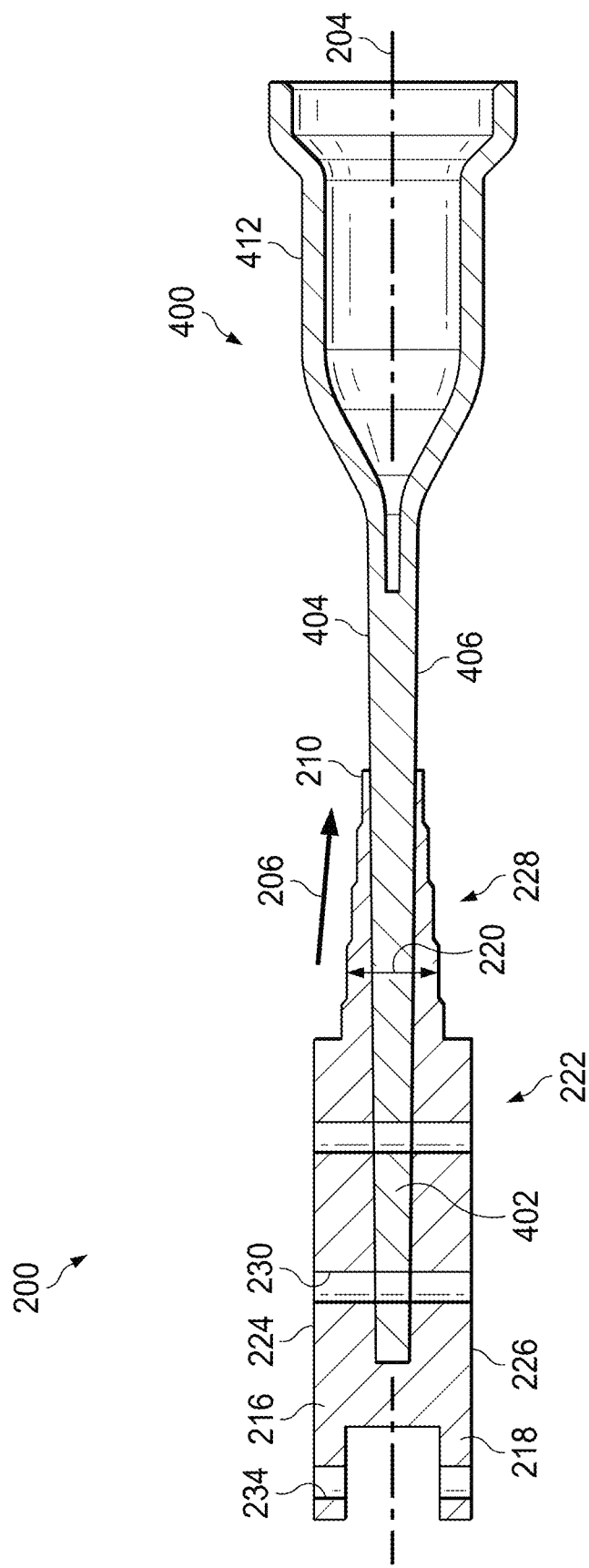
FIG. 5 is a sectional view of an exemplary load transfer apparatus attached to a rotor blade test specimen.

FIGS. 4 and 5 illustrate an exemplary apparatus 200 secured to a tip portion 402 of rotor blade test specimen 400. Tip portion 402 is positioned inside of the internal cavity and is bonded to body 202. In this example, passages 230 extend through the top and bottom portions 216, 218 of body 202 and the blade tip portion is located in internal cavity 212. Bolts 232 (FIG. 6) are positioned in passages 230 to secure apparatus 200 and specimen 400 in the test jig of FIG. 6. In a single-piece configuration, tip portion 402 extends through opening 214 into internal cavity 212. In a two-piece configuration, body 202 is divided into top and bottom portions 216, 218 which are positioned on tip portion 402.

Figures 6, 7:
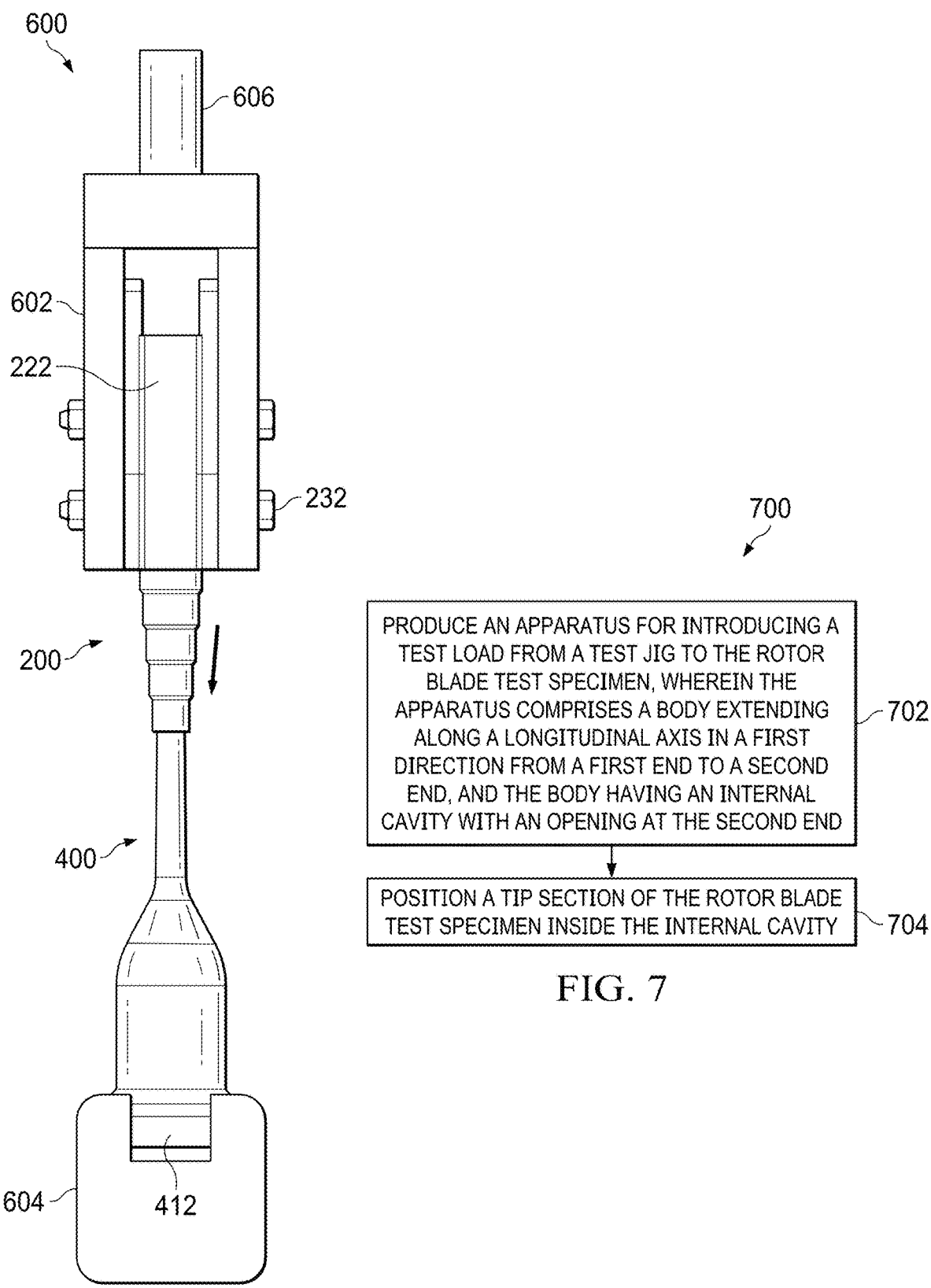
FIG. 6 schematically illustrates a rotor blade test specimen in a test jig.
FIG. 7 is block diagram of an exemplary method for preparing a rotor blade test specimen for fatigue testing.

FIG. 6 schematically illustrates an exemplary test jig 600. Apparatus 200 is attached to the tip of rotor blade test specimen 400. A first clamp 602 grips clamp portion 222. In this example, first clamp 602 uses bolts 232 to grip apparatus 200 and rotor blade test specimen 400. In other test jigs, first clamp 602 is a hydraulic clamp. A second clamp 604, e.g., a hydraulic clamp, holds root 412 of rotor blade test specimen 400. Test jig 600 has an actuator 606 that applies an axial load to rotor blade test specimen 400.

It is important that the test load is applied at the correct position. For this reason, alignment of all components in the test jig is critical. Apparatus 200 may have embedded alignment features, e.g., holes or markings, which are useful to position the rotor blade test specimen in the test jig precisely. This will prevent offsets in the load direction which will cause undesired effects. In the case of a two-piece configuration, the alignment features may also be used properly assemble the two pieces around the blade test specimen. Exemplary embedded alignment features include planar sections 224, 226, and alignment holes 234 (FIGS. 2-5).

FIG. 7 illustrates an exemplary method 700 for preparing a rotor blade test specimen for fatigue testing, which is described with reference to the other figures. At block 702, an apparatus 200 is produced, for example by additive manufacturing, for introducing a test load from a test jig 600 to a rotor blade test specimen 400. Apparatus 200 includes a body 202 extending along a longitudinal axis 204 in a first direction 206 from a first end 208 to a second end 210, and the body has an internal cavity 212 with an opening 214 at the second end. At block 704, a tip portion 402 of the rotor blade test specimen is positioned inside the internal cavity. In a single-piece configuration, tip portion 402 is positioned in the internal cavity by sliding it through opening 214. In a two-piece configuration, the tip portion is positioned by assembling the two pieces, e.g., top and bottom portions 216, 218 together on tip portion 402.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The term "substantially," "approximately," "generally," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," "generally," and "about" may vary from the stated value, for example, by 0.1, 0.5, 1, 2, 3, 4, 5, 10, or 15 percent as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An apparatus for introducing a test load to a rotor blade test specimen for fatigue testing, the apparatus comprising:
    a body extending along a longitudinal axis in a first direction from a first end to a second end; and
    the body having an internal cavity, with an opening at the second end, configured to dispose a tip portion of the rotor blade test specimen;
    wherein a stiffness of the body progressively decreases in the first direction.

2. The apparatus of claim 1, wherein a thickness of the body progressively decreases in the first direction.

3. The apparatus of claim 1, wherein the body comprises a clamp portion extending from the first end, the clamp portion have a top planar section and bottom planar section; and
    a load transfer portion extending from the clamp portion to the second end.

4. The apparatus of claim 3, wherein a stiffness of the load transfer portion progressively decreases in the first direction.

5. The apparatus of claim 3, wherein a thickness of the load transfer portion progressively decreases in the first direction.

6. The apparatus of claim 1, wherein the body consists of a single piece.

7. The apparatus of claim 1, wherein the body consists of two pieces.

8. The apparatus of claim 1, wherein the body comprises an alignment feature configured to position the rotor blade test specimen in a fatigue testing jig whereby the test load will be applied at a desired position.

9. An apparatus for introducing a test load to a rotor blade test specimen for fatigue testing, the apparatus comprising:
    a body extending along a longitudinal axis in a first direction from a first end to a second end, the body, a stiffness of the body progressively decreasing in the first direction, the body comprising:
    an internal cavity, having an opening at the second end, configured to dispose a tip portion of the rotor blade test specimen;
    a clamp portion extending from the first end, the clamp portion have a top planar section and bottom planar section; and
    a load transfer portion extending from the clamp portion to the second end, wherein a stiffness of the load transfer portion progressively decreases in the first direction.

10. The apparatus of claim 9, wherein the body consists of a single piece.

11. The apparatus of claim 9, wherein the body consists of two pieces.

12. A method for preparing a rotor blade test specimen for fatigue testing, the method comprising:
    producing an apparatus for introducing a test load from a test jig to the rotor blade test specimen, wherein the apparatus comprises a body extending along a longitudinal axis in a first direction from a first end to a second end, and the body having an internal cavity with an opening at the second end; and
    positioning a tip portion of the rotor blade test specimen inside the internal cavity;
    wherein a stiffness of the body progressively decreases in the first direction.

13. The method of claim 12, wherein the apparatus consists of a single piece.

14. The method of claim 12, wherein the apparatus consists of two pieces.

15. The method of claim 12, wherein a thickness of the body progressively decreases in the first direction.

16. The method of claim 12, wherein the body comprises a clamp portion extending from the first end, the clamp portion have a top planar section and bottom planar section, and a load transfer portion extending from the clamp portion to the second end, wherein a stiffness of the load transfer portion progressively decreases in the first direction.

17. The method of claim 16, wherein the body consists of a single piece.

18. The method of claim 16, wherein the body consists of two pieces.

* * * * *

UNITED STATES PATENT AND TRADEMARK OFFICE
CERTIFICATE OF CORRECTION

PATENT NO. : 11,761,866 B2
APPLICATION NO. : 17/678808
DATED : September 19, 2023
INVENTOR(S) : Louis Charron et al.

It is certified that error appears in the above-identified patent and that said Letters Patent is hereby corrected as shown below:

In the Claims

Claim 9, Column 6, Lines 18-21    Replace "a body extending along a longitudinal axis in a first direction from a first end to a second end, the body, a stiffness of the body progressively decreasing in the first direction, the body comprising:" with --"a body extending along a longitudinal axis in a first direction from a first end to a second end, a stiffness of the body progressively decreasing in the first direction, the body comprising:"--

Signed and Sealed this
Seventh Day of November, 2023

Katherine Kelly Vidal
*Director of the United States Patent and Trademark Office*